US011717958B2

(12) United States Patent
Xu et al.

(10) Patent No.: US 11,717,958 B2
(45) Date of Patent: Aug. 8, 2023

(54) JOINT CONTROL METHOD, COMPUTER-READABLE STORAGE MEDIUM AND MULTI-LEGGED ROBOT

(71) Applicant: UBTECH ROBOTICS CORP LTD, Shenzhen (CN)

(72) Inventors: Zhe Xu, Shenzhen (CN); Mingguo Zhao, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 307 days.

(21) Appl. No.: 17/345,005

(22) Filed: Jun. 11, 2021

(65) Prior Publication Data
US 2021/0387332 A1 Dec. 16, 2021

(30) Foreign Application Priority Data
Jun. 15, 2020 (CN) .......................... 202010540353.6

(51) Int. Cl.
*B25J 9/16* (2006.01)
*B25J 13/08* (2006.01)
*B62D 57/032* (2006.01)
*G05D 1/08* (2006.01)

(52) U.S. Cl.
CPC ........... *B25J 9/1607* (2013.01); *B25J 13/085* (2013.01); *B25J 13/088* (2013.01); *B62D 57/032* (2013.01); *G05D 1/0891* (2013.01)

(58) Field of Classification Search
None
See application file for complete search history.

(56) References Cited

U.S. PATENT DOCUMENTS

| | | | |
|---|---|---|---|
| 2013/0144441 A1* | 6/2013 | Kanazawa | B25J 9/1607 700/263 |
| 2015/0045954 A1* | 2/2015 | Negishi | B25J 9/1607 700/262 |
| 2021/0197371 A1* | 7/2021 | Huang | B25J 13/085 |
| 2021/0387332 A1* | 12/2021 | Xu | B62D 57/032 |
| 2022/0015846 A1* | 1/2022 | Li | A61B 90/03 |
| 2022/0105628 A1* | 4/2022 | Madsen | G05B 19/4155 |

\* cited by examiner

*Primary Examiner* — Jonathan L Sample
*Assistant Examiner* — Mohammed Yousef Abuelhawa

(57) ABSTRACT

A method for a multi-legged robot having a body and a number of legs, includes: obtaining a current pose of the body, forces applied to the body, and joint angles of each of supporting legs of the legs; creating a mapping matrix from the forces applied to the body to desired support forces applied to soles of the supporting legs; obtaining priority targets by prioritizing the forces acting in different directions, determining a weight matrix for each priority target, and creating an optimization model of the support forces for each priority target based on the mapping matrix and the weight matrices; solving the optimization model of each of the priority targets to obtain the desired support forces corresponding to each of the priority targets; and calculating joint torques of the supporting legs for joint control, based on the solved desired support forces and Jacobian matrices corresponding to the supporting legs.

20 Claims, 8 Drawing Sheets

JOINT CONTROL METHOD, COMPUTER-READABLE STORAGE MEDIUM AND MULTI-LEGGED ROBOT

CROSS REFERENCE TO RELATED APPLICATIONS

This application claims priority to Chinese Patent Application No. 202010540353.6, filed Jun. 15, 2020, which is hereby incorporated by reference herein as if set forth in its entirety.

BACKGROUND

1. Technical Field

The present disclosure generally relates to robots, and particularly to a joint control method for a multi-legged robot.

2. Description of Related Art

For a quadruped robot with position-controlled joints or force-controlled joints, it is necessary to calculate the torque required by each joint of the robot. In the process of controlling the quadruped robot to walk, one control goal requires the robot's torso to reach a certain state (position and speed). One controller of the quadruped robot calculates the virtual forces and torques required for the robot's torso to reach the state. A conventional control method maps the forces applied to the torso of the robot to the support forces applied to the soles of the robot in contact with a support surface (e.g., floor, ground, etc.) to achieve motion control. One problem with the conventional control method is that the calculation time for solution is long and the hardware requirements are high.

Therefore, there is a need to provide a joint control method for a multi-legged robot to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
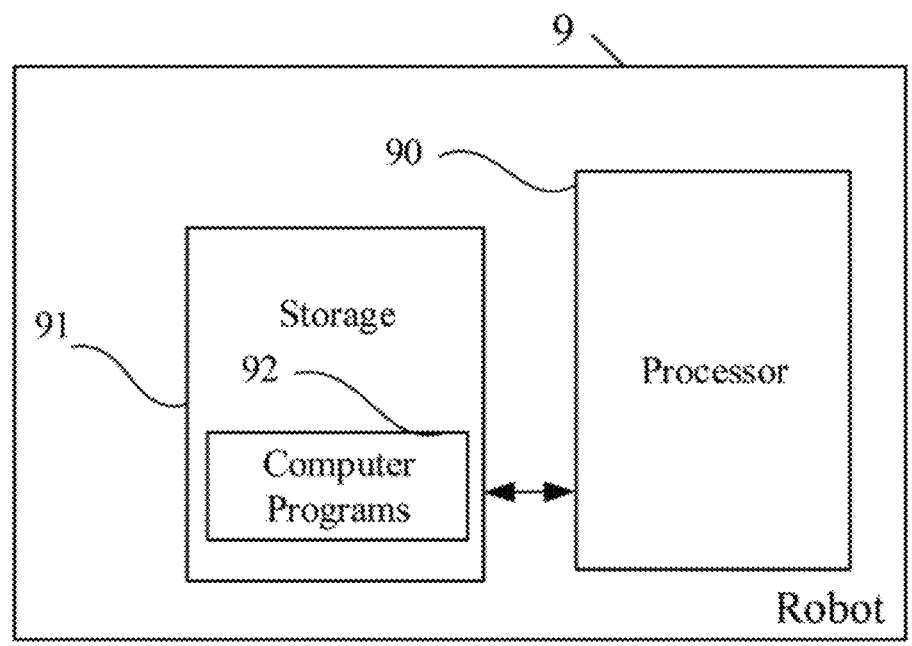
FIG. 1 is a schematic block diagram of a multi-legged robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 8:
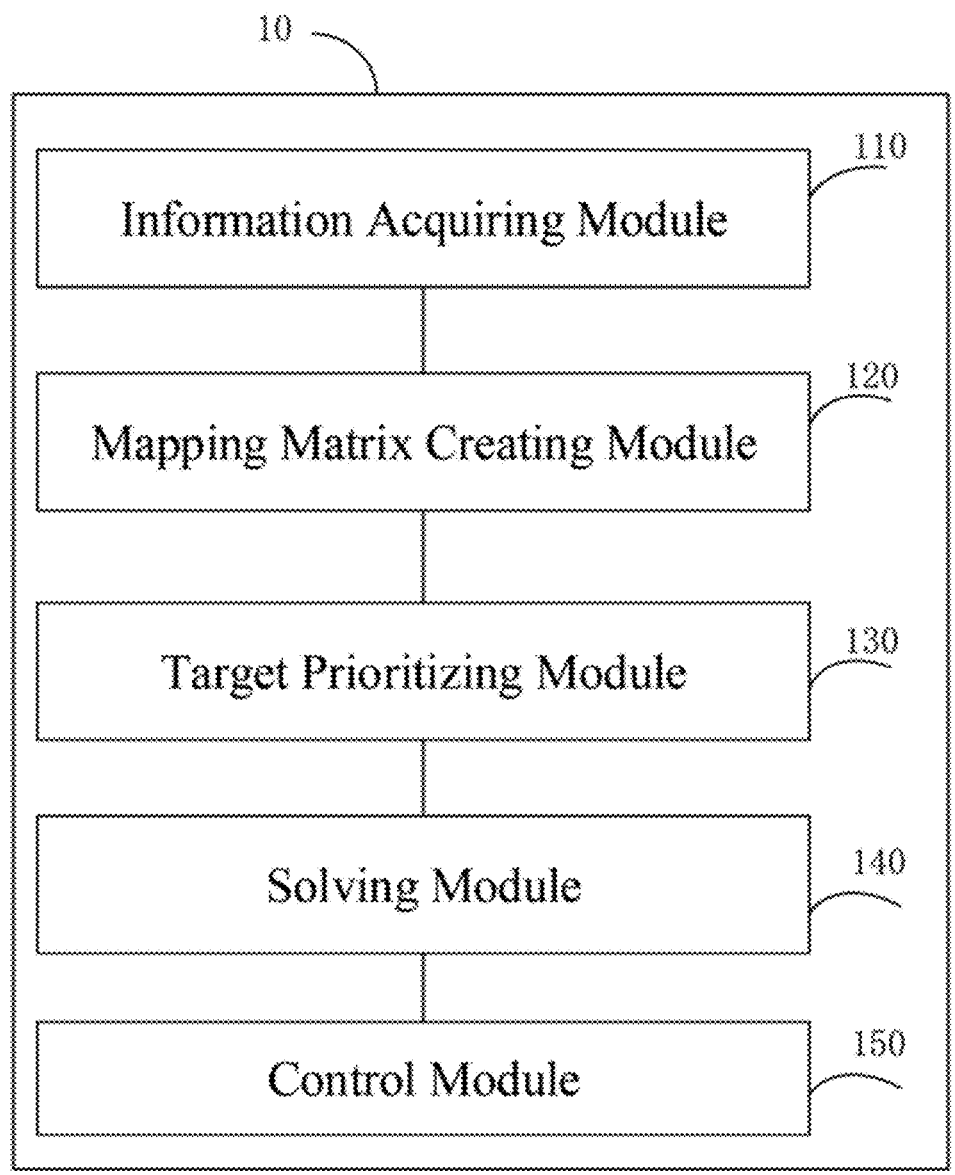
FIG. 8 is a schematic block diagram of a robot control device according to one embodiment.

FIG. 1 is a schematic block diagram of a multi-legged robot 9 according to one embodiment. The robot 9 may be a quadruped robot or a six-legged robot. The robot 9 includes a processor 90, a storage 91, one or more computer programs 92 stored in the storage 91 and executable by the processor 90. When the processor 90 executes the computer programs 92, the steps in the embodiments of the method for controlling the robot 9, such as steps S10 through S50 in FIG. 2, steps S210 to S240 in FIG. 6, and functions of modules/units in the embodiments, such as units 110 through 150 in FIG. 8, are implemented.

Exemplarily, the one or more computer programs 92 may be divided into one or more modules/units, and the one or more modules/units are stored in the storage 91 and executed by the processor 90. The one or more modules/units may be a series of computer program instruction segments capable of performing specific functions, and the instruction segments are used to describe the execution process of the one or more computer programs 92 in the robot 9. For example, the one or more computer programs 92 may be divided into an acquiring module, a calculating module, a first processing module, and a second processing module. The specific functions of each module will be described in detail later.

It should be noted that FIG. 1 is merely an example of the robot 9, and does not limit the robot 9. The robot 9 may include components different in numbers from those illustrated, or incorporate some other different components. For example, the robot 9 may further include an input and output device, a network access device, a bus, and the like.

The processor 90 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 91 may be an internal storage unit of the robot 9, such as a hard disk or a memory. The storage 91 may also be an external storage device of the robot 9, such as a plug-in hard disk, a smart memory card (SMC), and a secure digital (SD) card, or any suitable flash cards. Furthermore, the storage 91 may also include both an internal storage unit and an external storage device. The storage 91 is used to store computer programs, other programs, and data required by the robot. The storage 91 can also be used to temporarily store data that have been output or is about to be output.

Figure 2:
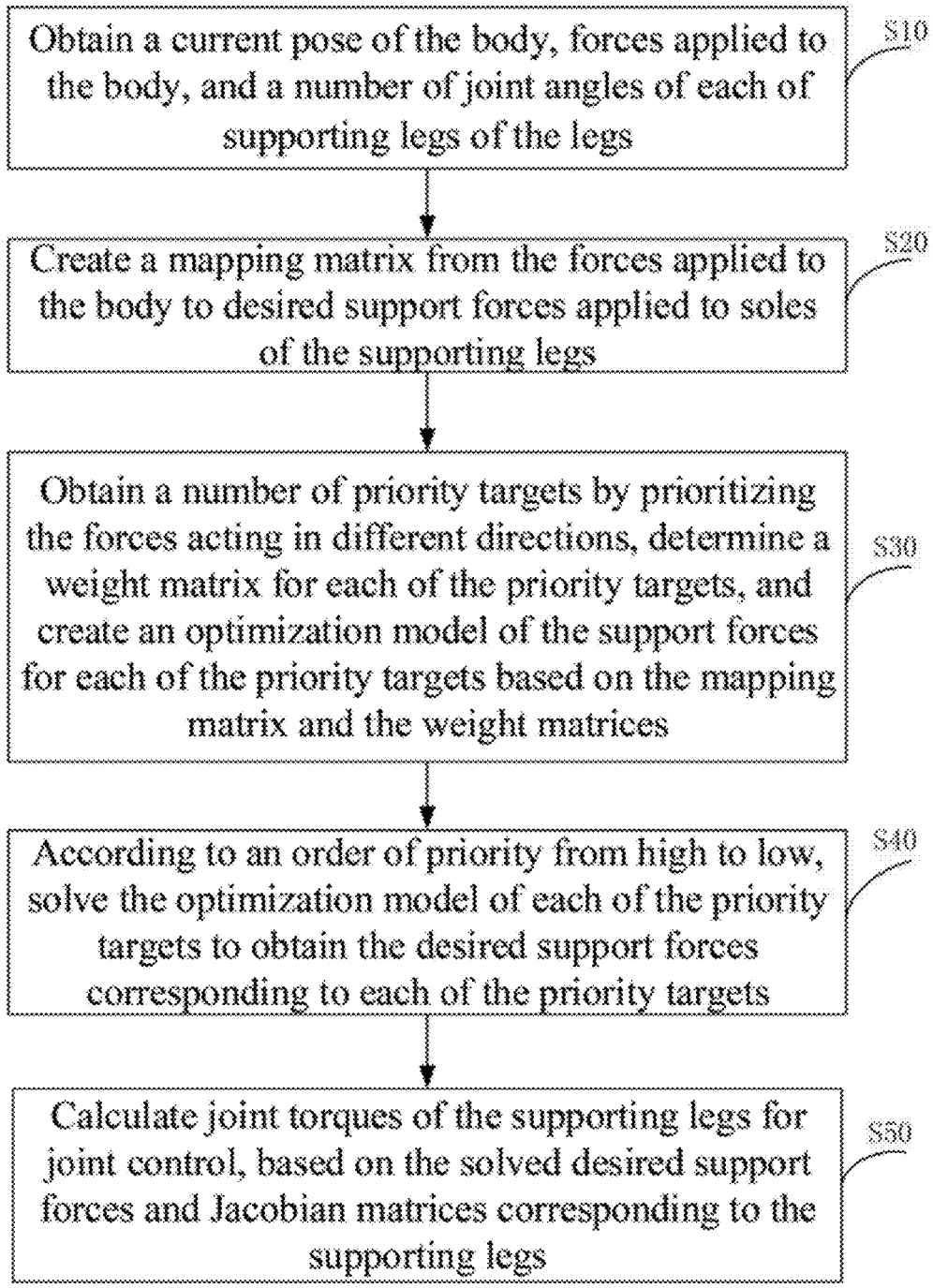
FIG. 2 is a flowchart of a joint control method according to one embodiment.

FIG. 2 is an exemplary flowchart of a joint control method according to one embodiment, which may include steps as follows.

Step S10: Obtain a current pose of the body, forces applied to the body, and a number of joint angles of each of supporting legs of the legs, wherein the forces act in different directions.

In one embodiment, the pose (i.e., position and orientation) of the body of the multi-legged robot can be measured by an inertial measurement unit (IMU) or other pose sensors.

The forces applied to the body can be calculated by a controller of the robot. Generally, when the body of the robot needs to be controlled to reach a certain state, the forces applied to the body required by the multi-legged robot needs to be determined first according to the planned trajectory or desired state of the body. Generally, the forces applied to the body can be a six-dimensional vector including three forces along an x-axis, a y-axis, and a z-axis and three torques about the x-axis, the y-axis, and the z-axis.

In one embodiment, the phases of each leg of the robot in one gait cycle include a support phase and a swing phase. The swing phase begins when a foot first leaves the support surface (e.g., ground, floor, etc.) and ends when the same foot touches the support surface again. The support phase begins when the foot first touches the support surface and ends when the same foot leaves the support surface. The supporting legs refer to the legs in the support phase. That is, the supporting legs are the legs whose feet are in contact with the surface. According to the phase information of each leg of the robot, the number of legs in the support phase (i.e., the number of supporting legs) can be determined.

In one embodiment, each leg of the robot is equipped with sensors to collect the information of each joint. For example, for each joint angle of each supporting leg, it can be obtained by an angular displacement sensor or a position encoder arranged on the corresponding supporting leg.

Step S20: Create a mapping matrix from the forces applied to the body to desired support forces applied to soles of the supporting legs.

In one embodiment, the mapping matrix is created based on the current pose of the body, the forces applied to the body, and the joint angles of each of the supporting legs. It should be noted that the support state of the robot is related to the number of legs currently in the support phase. When the support state of the robot is different, the corresponding mapping matrix will also be different.

Figure 3:
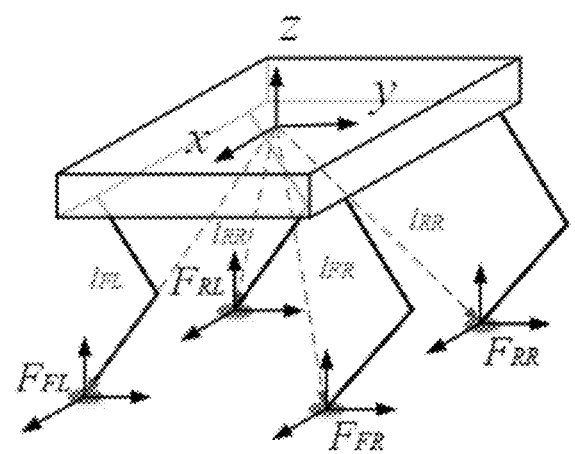
FIG. 3 is a schematic diagram showing that the robot is supported by four legs.
Figure 4:
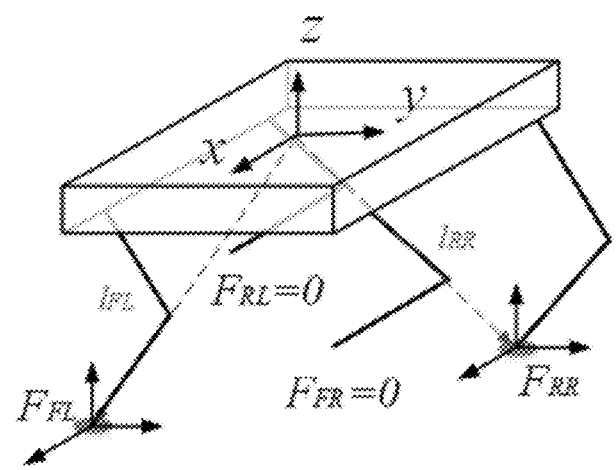
FIG. 4 is a schematic diagram showing that the robot is supported by a diagonal pair of legs.
Figure 5:
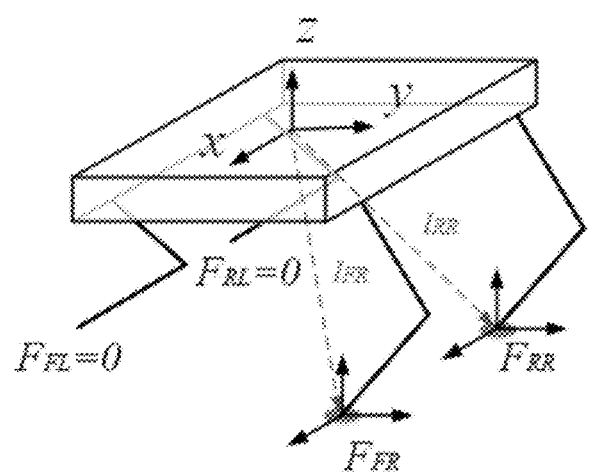
FIG. 5 is a schematic diagram showing that the robot is supported by two legs at the same side.

The number of legs of a robot having N legs in the support phase is $N_s$, and the number of legs in the swing phase is $N-N_s$. Taking a quadruped robot as an example, FIGS. 3-5 illustrate three typical situations of the quadruped robot, namely the robot being supported by four legs ($N_s=4$), the robot being supported by a diagonal pair of legs ($N_s=2$), and the robot being supported by two legs at the same side ($N_s=2$). Of course, there are other support situations for the quadruped robot, which are not listed here.

In one embodiment, the forces applied to the body include three-dimensional forces and three-dimensional torques. The three-dimensional forces refer to the three forces applied to the body along an x-axis, a y-axis, and a z-axis. The three-dimensional torques refer to three torques applied to the body about the x-axis, the y-axis, and the z-axis. In one embodiment, the mapping matrix can be solved based on the relationship equations between the three-dimensional forces/torques applied to the body and desired support forces applied to soles of the supporting legs.

Figure 6:
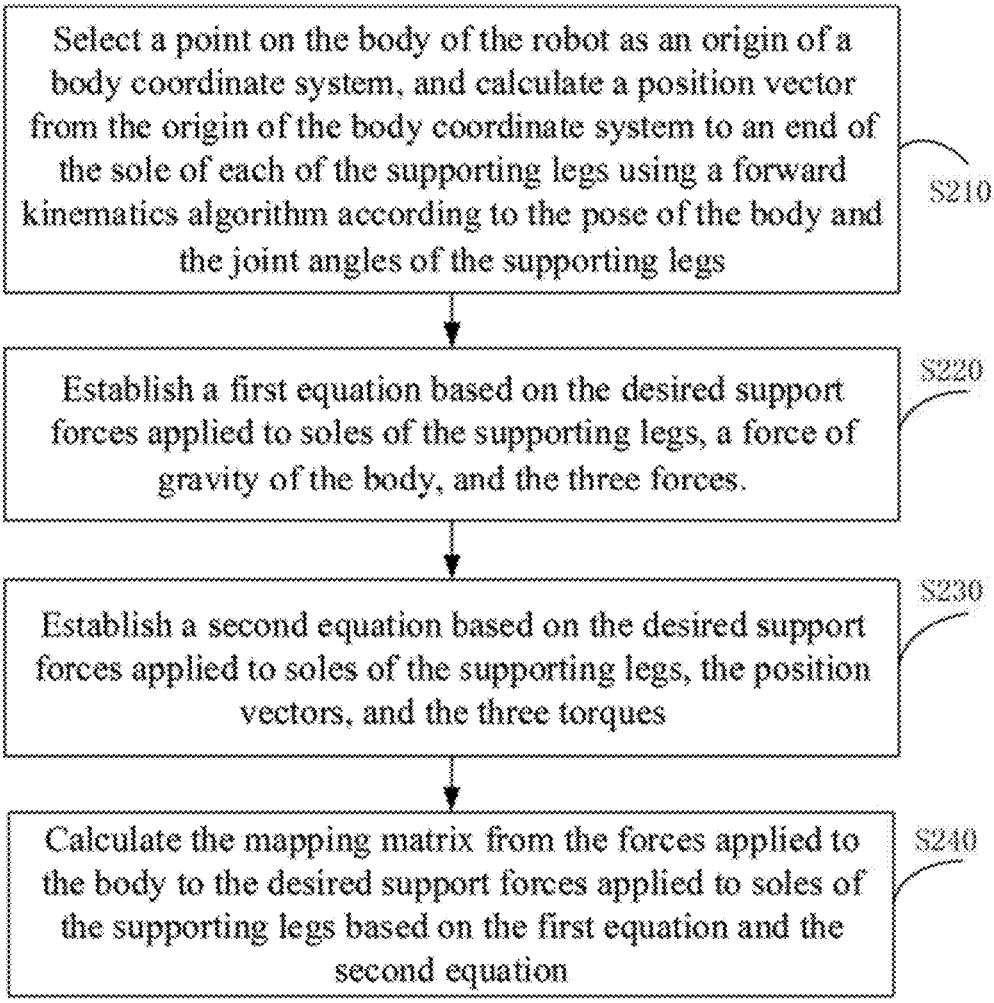
FIG. 6 is a flowchart of a flowchart of a joint control method according to one embodiment.

Referring to FIG. 6, in one embodiment, step S20 may include steps as follows.

Step S210: Select a point on the body of the robot as an origin of a body coordinate system, and calculate a position vector from the origin of the body coordinate system to an end of the sole of each of the supporting legs using a forward kinematics algorithm according to the pose of the body and the joint angles of the supporting legs. In one embodiment, the center of mass of the body of the robot is used as the origin of the body coordinate system.

In one embodiment, after determining the support situation of the robot, the position of the end of the sole of each of the supporting legs relative to the origin can be calculated. As shown in FIG. 3, if a supporting leg has 3 joints, the sole of the supporting leg can generate a 3-dimensional supporting force. According to the joint angles of the supporting leg and the pose of the body, the position l ($l \in R^{3 \times 1}$) of the end of the sole of the supporting leg in the body centroid coordinate system can be obtained based on a forward kinematics algorithm according to the formula as follows: $l = FK(q_1, q_2, q_3, \theta_r, \theta_p, \theta_y)$ where $q_1, q_2, q_3$ represent three joint angles of the supporting leg, $\theta_r, \theta_p, \theta_y$ represent the orientations of the body (i.e., roll, pitch and yaw angles), FK( ) represents the forward kinematics function from a base coordinate system to the end of the sole of the supporting leg, which is well known and will not be repeated here.

Step S220: Establish a first equation based on the desired support forces applied to soles of the supporting legs, a force of gravity of the body, and the three forces.

The force analysis of the body shows that the three-dimensional forces applied to the body is equal to the vector sum of the desired support forces applied to soles of the supporting legs and the force of gravity of the body. Based on this, the first equation can be established.

Step S230: Establish a second equation based on the desired support forces applied to soles of the supporting legs, the position vectors, and the three torques.

The three-dimensional torques of the body is equal to the sum of the cross products the end of the sole of each supporting leg to the position vectors at the origin of the body coordinate system and desired support forces applied to sole of the corresponding supporting leg. Based on this, the second equation can be established.

Step S240: Calculate the mapping matrix from the forces applied to the body to the desired support forces applied to soles of the supporting legs based on the first equation and the second equation.

The mapping from the six-dimensional forces applied to the body of the robot to the desired support forces applied to soles of the supporting legs can be calculated by combining the two equations above. It should be noted that the execution order of the steps between steps S210 and S220 and between steps S220 and S230 is not limited.

The following takes the situation shown in FIG. 3 as an example to illustrate the solution of a mapping matrix.

If the four legs are represented as FL (Front-Left), FR (Front-Right), RL (Rear-Left), RR (Rear-Right), which correspond to the front left leg, front right leg, rear left leg and back right leg, the 3-dimensional support forces generated by each leg is expressed as $F_{FL}, F_{FR}, F_{RL}, F_{RR} \in R_{3 \times 1}$. As shown in FIG. 3, the origin of the coordinate system is at the center of mass of the body of the robot, and the positions of the ends of the soles of the supporting legs in the coordinate system are represented as $l_{FL}, l_{FR}, l_{RL}, l_{RR}$, and can be calculated according to the formulas below: $l_{FL}=FK_{FL}(q_{FL1}, q_{FL2}, q_{FL3}, \theta_r, \theta_p, \theta_y)$; $l_{FR}=FK_{FR}(q_{FR1}, q_{FR2}, q_{FR3}, \theta_r, \theta_p, \theta_y)$; $l_{RL}=FK_{RL}(q_{RL1}, q_{RL2}, q_{RL3}, \theta_r, \theta_p, \theta_y)$; $l_{RR}=FK_{RR}(q_{RR1}, q_{RR2}, q_{RR3}, \theta_r, \theta_p, \theta_y)$, where $(q_{FL1}, q_{FL2}, q_{FL3})$ represent the three joint angles of the front left leg, $(q_{FR1}, q_{FR2}, q_{FR3})$ represent the three joint angles of the front right leg, $(q_{RL1}, q_{RL2}, q_{RL3})$ represent the three joint angles of the rear left leg, $(q_{RR1}, q_{RR2}, q_{RR3})$ represent the three joint angles, of the rear right leg, and $FK_{FL}, FK_{FR}, FK_{RL}, FK_{RR}$ represent the kinematic functions of the four legs from the base coordinate system to the soles of the legs.

The forces $F_B$ applied to the body can be represented by a six-dimensional vector $[F_x, F_y, F_z, \tau_x, \tau_y, \tau_z]^T$, where $F_x, F_y, F_z$ represent the three forces applied to the body along an x-axis, a y-axis, and a z-axis, $\tau_x$, $\tau_y$, $\tau_z$ represent the three torques applied to the body about the x-axis, the y-axis, and the z-axis. Here it is assumed that the center of mass of the body of the robot coincides with the origin of the body coordinate system. If it does not coincide, the torque generated by the force of gravity relative to the body coordinate system should be considered. Therefore, the first equation of the above-mentioned supporting force of each leg and the three-dimensional forces applied to the body is established as follows:

$$F_{FL} + F_{FR} + F_{RL} + F_{RR} + \begin{bmatrix} 0 \\ 0 \\ -mg \end{bmatrix} = \begin{bmatrix} F_x \\ F_y \\ F_z \end{bmatrix},$$

where m represents the mass of the body of the robot, g represents the gravitational acceleration. The second equation of the above-mentioned supporting force of each supporting leg and the three-dimensional torques applied to the body is established as follows:

$$l_{FL} + F_{FL} + l_{FR} \times F_{FR} + l_{RL} \times F_{RL} + l_{RR} + F_{RR} = \begin{bmatrix} \tau_x \\ \tau_y \\ \tau_z \end{bmatrix}.$$

The mapping matrix $L_{all}$ ($L_{all} \in R^{6 \times 12}$) from the forces applied to the body to the desired support forces applied to soles of the supporting legs can be obtained by combing the two equations as follows:

$$L_{all} \begin{bmatrix} F_{FL} \\ F_{FR} \\ F_{RL} \\ F_{RR} \end{bmatrix} = F_B.$$

In the same way, the mapping matrices and as shown in FIGS. 4 and 5 can also be calculated. Since the robot in FIGS. 4 and 5 is supported by two legs, the corresponding mapping matrices $\in R^{6 \times 6}$.

Since there is no inverse matrix for the mapping matrix solved above, it means that physically there are multiple groups of desired support forces applied to soles of the supporting legs which can satisfy the group of forces applied to the body of the robot. In this case, it is necessary to apply an optimization method to obtain desired support forces applied to soles of the supporting legs. When the robot is supported by four legs, $F_L = [F_{FL}, F_{FR}, F_{RL}, F_{RR}]^T$ and $L = L_{all}$, where $F_L$ represents the vector composed of the desired support forces applied to soles of the supporting legs, and L represents the corresponding mapping matrix. When the robot is supported by two legs, $F_L = [F_{FL}, F_{RR}]^T$ or $F_L = [F_{FR}, F_{RL}]^T$, and correspondingly $L = L_{FL\_RR}$ or $L = L_{FR-RL}$.

Step S30: Obtain a number of priority targets by prioritizing the forces acting in different directions, determine a weight matrix for each of the priority targets, and create an optimization model of the support forces for each of the priority targets based on the mapping matrix and the weight matrices.

Specifically, step S30 mainly uses the idea of stratification to gradually solve desired support forces applied to soles of the supporting legs. In one embodiment, by dividing the forces applied to the body in different directions into different priority tasks and objectives, it can reduce the calculation amount for solving the desired support forces applied to soles of the supporting legs.

In one embodiment, task objectives can be divided according to the importance of the forces applied to the body of the robot in different directions. The number N of divided priorities can be selected according to actual needs, but should satisfy 1<N≤6, where N is a natural number. For example, if the movement of the robot in the x direction is considered more important, and the movement in the y direction is considered less concerned, the force in the x direction can be prioritized as a higher priority target, and the force in the y direction is prioritized as a lower priority target.

In one embodiment, the robot walking on a horizontal surface is taken as an example. If it is considered that the pitch angle (rotation in the y direction) and the roll angle (rotation in the x direction) of the body of the robot and the height in the z direction are the primary factors to ensure the balance of the robot, and other factors are less important, the six elements in the six-dimensional forces applied to the body of the robot can be divided into two priority targets, that is, the number of priorities is 2. The two priority targets $F_1$ and $F_2$ are expressed as follows: $F_1 = [F_z, \tau_x, \tau_y]^T$ and $F_2 = [F_x, F_y, \tau_z]^T$.

It should be noted that the number of priorities and the number of elements in each priority target in the embodiment above are not limited, and can change according to actual needs.

In one embodiment, determining the weight matrix for each of the priority targets, and creating the optimization model of the support forces for each of the priority targets based on the mapping matrix and the weight matrices may include steps as follows.

Step S30a: According to a number of elements in each of the priority targets and a position of each of the elements in the forces applied to the body, select row vectors from the mapping matrix to create sub-mapping matrices of the priority targets.

Step S30b: For an i-th priority target $F_i$, solve a corresponding one of the desired support forces $F_{Li}$ applied to soles of the legs using any of optimization models as follows: $F_{Li} = \text{argmin}((K_i L_i F_{Li} - K_i F_i)^T (K_i L_i F_{Li} - K_i F_i))$; and $F_{Li} = \text{pinv}(K_i L_i) K_i F_i$, where $K_i$ represents the weight matrix corresponding to the i-th priority target $F_i$, $L_i$ represents the sub-mapping matrix corresponding to the i-th priority target $F_i$, i is a natural number, 1≤i≤N, argmin represents the value of the variable when the target gets the minimum value, and pinv represents the pseudo-inverse operation symbol. In one embodiment, the above-mentioned pseudo-inverse solving method can reduce the computational burden, thereby increasing the code execution speed. The above-mentioned weight matrices can be set according to empirical values.

The following descriptions will be made by taking the first priority target $F_1$ as an example. Since $F_1 = [F_z, \tau_x, \tau_y]^T$ includes three elements $F_z$, $\tau_x$, $\tau_y$, and the three elements are in the 3rd to 5th rows of the six-dimensional forces applied to the body of the robot, so the 3rd to 5th rows of vectors can be selected from the mapping matrix solved in step S10 to establish the sub-mapping matrix of first priority target. In one embodiment, the optimization model corresponding to the first priority target $F_i$ can be expressed as $F_{L1} = \text{pinv}(K_1 L_1) K_1 F_1$, and the optimization model corresponding to the second priority target can be expressed as $F_{L2} = \text{pinv}(K_2 L_2) K_2 F_2$.

Step S40: According to an order of priority from high to low, solve the optimization model of each of the priority targets to obtain the desired support forces corresponding to each of the priority targets, wherein one of the desired support forces corresponding to a current priority target serves as a basis for solving one of the support forces corresponding to a next priority target.

Step S40 mainly uses the idea of stratification to solve the low-priority targets based on the solution result of the high-priority target, so as to ensure that low-priority target tasks will not affect high-priority target tasks.

In one embodiment, the solving basis may include: solving the one of the support forces corresponding to the next priority target in a null space of the one of the desired support forces corresponding to the current priority target. That is, finding the solution of the low-priority target in the solution null space of the high and low priority targets.

In one embodiment, step S40 may include optimally solving the optimization model constructed for the target with the highest priority to obtain the desired support forces applied to soles of the supporting legs that satisfy the first priority target. After that, the corresponding null space is further solved.

After that, in the null space of the desired support forces applied to soles of the supporting legs of the first priority target, the second priority target is optimally solved, and a solution that satisfies or is closest to the second priority target as the one of the support forces of the second priority target. For other priority targets, the desired support forces applied to soles of the supporting legs of the next priority target is calculated from the solution null space of the previous priority target.

It should be noted that in the null space corresponding to the previous priority target, the solution of the optimization model corresponding to the next priority target may not directly meet the current optimization target. In this case, the solution closest to the current optimization target can be selected as the corresponding desired support forces applied to soles of the supporting legs. The term "closest" may mean that the deviation between the solution obtained by the above-mentioned optimization model and the target solution is the smallest. In other words, it is the optimal solution that is closest to the desired target. For example, it may be that the distance between the calculated solution and the desired target is the closest.

The following descriptions will be made by taking two priority targets as an example. According to the optimization model (i.e., $F_{L1} = pinv(K_1L_1)K_1F_1$) of the desired support forces applied to soles of the supporting legs corresponding to first priority target, the corresponding solution $F_{L1}$ can be obtained by optimally solving the optimization model, and is used as the desired support forces applied to soles of the supporting legs corresponding to first priority target. Then, the null space (i.e., $N(L_1) = \{F_{L1} | L_1F_{L1} = 0\}$) of the desired support forces applied to soles of the supporting legs corresponding to the first priority target is solved. In the above-mentioned null space, the optimization model established for the second priority target $F_2$ is optimally solved according to formulas as follows:

$$\begin{cases} F_{L2} - N(L_1); N(L_1) - \{F_{L1} | L_1F_{L1} - 0\}; \\ F_{L2} = \text{argmin}((K_2L_2F_{L2} - K_2F_2)'(K_2L_2F_{L2} - K_2F_2)) \\ \text{或} F_{L2} = plnv(K_2L_2)K_2F_2. \end{cases}$$

The solution that can satisfy the second priority target $F_2$ is used as the desired support forces $F_{L2}$ applied to soles of the supporting legs corresponding to the second priority target. If there is no solution that directly satisfies the target, that is, there is no solution that satisfies the null space of the first priority target and the optimization model of the second priority target, the solution in the null space of the first priority target that is closest to the second priority target $F_2$ is used as the desired support forces $F_{L2}$ applied to soles of the supporting legs corresponding to the second priority target $F_2$.

In addition to the above-mentioned null-space solution method, as long as it can be ensured that low-priority target tasks will not affect high-priority target tasks, other methods can also be used to solve the desired support forces corresponding to each priority target.

Step S50: Calculate joint torques of the supporting legs for joint control, based on the solved desired support forces and Jacobian matrices corresponding to the supporting legs.

Figure 7:
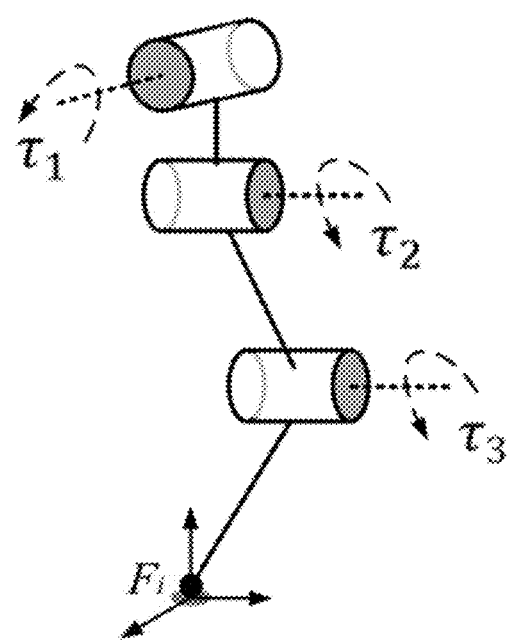
FIG. 7 is a schematic diagram of three joints of a single leg of the robot according to one embodiment.

In one embodiment, the solved desired support forces corresponding to all priority targets are used as the desired support forces of the supporting legs. Based on the desired support forces applied to the sole of each supporting leg, the torque required by the joints of each supporting leg can be calculated. Taking the number of joints of each leg being equal to three as an example, as shown in FIG. 7, the desired support forces applied to the sole of a supporting leg is completely determined by the three joint torques $\tau_1$, $\tau_2$, $\tau_3$.

For robots, the ratio of the body to the legs is usually fixed. The ratio of the inertia of the body to the inertia of the legs is greatly affected by their respective masses. Generally, when the ratio of the mass of the body to the mass of a single leg is greater than 7, the mass and inertia of the leg of the robot can be ignored. For simplification of calculation of the joint torques of the supporting legs, the mass and inertia of the legs of the robot are ignored in one embodiment.

In one embodiment, the torques of the joints will be calculated based on the Jacobian matrix. The joint of each leg of the robot that is closest to the body is referred to as the first joint, and the Jacobian matrix from the first joint to the end of the sole of a supporting leg can be calculated according to the joint angles of the supporting leg. Then, by multiplying the transpose of the Jacobian matrix and the desired support forces applied to the sole of one supporting leg together, the joint torques of each joint of the supporting leg can be calculated. For example, the joint torques of each joint of the supporting legs can be calculated according to a formular as follows: $J^T F = \tau$, where J represents the Jacobian matrix determined by the joint angles of the supporting legs, i.e., $J(q) \in R^{n \times n}$, n represents the number of the joint angles q; F represents the desired support forces applied to the soles of the supporting legs, $F \in R_{3 \times 1}$, $\tau$ represents the joint torque, $\tau \in R^{n \times 1}$.

The obtained joint torques are then sent to the corresponding joint motor of the current supporting legs, so that each joint motor can control the joint according to the corresponding joint torque.

The joint control method for the multi-legged robot in the embodiments above calculates the mapping matrix from the forces applied to the body of the robot to the desired support force applied to the sole of each supporting leg, uses the idea of stratification to prioritize the forces applied to the body, and creates an optimization model for each priority target to solve the desired support forces corresponding to each priority target. Finally, the joint torques of each leg is calculated according to the desired support forces and the Jacobian matrix. The solution of high priority target is used as the basis to solve the desired support forces corresponding to the low priority target, such as finding the low priority solution in the null space of the high priority target. In this way, the solving tasks of low priority targets will not affect the high priority targets, which can solve the problem that the weights of the weight matrix in the conventional robot control method affect each other. For the asynchronous state, there is no need to adjust the weight when changing the gait. In addition, due to hierarchical calculation, the amount of computer code is small, the calculation speed is fast, and the performance requirements for hardware can also be reduced.

FIG. 8 is a schematic block diagram of a robot control device 10 according to one embodiment. The device 10 may include an information acquiring module 110, a mapping matrix creating module 120, a target prioritizing module 130, a solving module 140, and a control module 150.

The information acquiring module 110 is configured to obtain a current pose of the body, forces applied to the body, and a plurality of joint angles of each of supporting legs of the legs. The forces act in different directions. The mapping matrix creating module 120 is configured to create a mapping matrix from the forces applied to the body to desired support forces applied to soles of the supporting legs based on the current pose of the body, the forces applied to the body, and the plurality of joint angles of each of the supporting legs. The target prioritizing module 130 is configured to obtain a number of priority targets by prioritizing the forces acting in different directions, determine a weight matrix for each of the priority targets, and create an optimization model of the support forces for each of the priority targets based on the mapping matrix and the weight matrices. The solving module 140 is configured to solve the optimization model of each of the priority targets according to an order of priority from high to low, to obtain the desired support forces corresponding to each of the priority targets. One of the desired support forces corresponding to a current priority target serves as a basis for solving one of the support forces corresponding to a next priority target. The control module 150 is configured to calculate joint torques of the supporting legs for joint control, based on the solved desired support forces and Jacobian matrices corresponding to the supporting legs.

The device 10 is configured to implement the method as shown in FIG. 2. The embodiments associated with the method as shown in FIG. 2 can also be implemented by the device 10, which will not be repeated here.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented joint control method for a multi-legged robot that comprises a body and a plurality of legs, the method comprising:
   obtaining a current pose of the body, forces applied to the body, and a plurality of joint angles of each of supporting legs of the legs, wherein the forces act in different directions;
   creating a mapping matrix from the forces applied to the body to desired support forces applied to soles of the supporting legs based on the current pose of the body, the forces applied to the body, and the plurality of joint angles of each of the supporting legs;
   obtaining a plurality of priority targets by prioritizing the forces acting in different directions, determining a weight matrix for each of the priority targets, and creating an optimization model of the support forces for each of the priority targets based on the mapping matrix and the weight matrices;
   according to an order of priority from high to low, solving the optimization model of each of the priority targets to obtain the desired support forces corresponding to each of the priority targets, wherein one of the desired support forces corresponding to a current priority target serves as a basis for solving one of the support forces corresponding to a next priority target; and
   calculating joint torques of the supporting legs for joint control, based on the solved desired support forces and Jacobian matrices corresponding to the supporting legs.

2. The method according to claim 1, wherein the forces applied to the body comprise three forces along an x-axis, a y-axis, and a z-axis and three torques about the x-axis, the y-axis, and the z-axis; creating the mapping matrix from the forces applied to the body to the desired support forces applied to soles of the supporting legs based on the current pose of the body, the forces applied to the body, and the plurality of joint angles of each of the supporting legs, comprises:
   selecting a point on the body as an origin of a body coordinate system, and calculating a position vector from the origin of the body coordinate system to an end of the sole of each of the supporting legs using a forward kinematics algorithm according to the pose of the body and the joint angles of the supporting legs;
   establishing a first equation based on the desired support forces applied to soles of the plurality of supporting legs, a force of gravity of the body, and the three forces;
   establishing a second equation based on the desired support forces applied to soles of the supporting legs, the position vectors, and the three torques;
   calculating the mapping matrix from the forces applied to the body to the desired support forces applied to soles of the supporting legs based on the first equation and the second equation.

3. The method according to claim 2, wherein the plurality of legs is four in number and each of the plurality of legs comprises three joints, the mapping matrix satisfies formulas as follows:

$$F_B = [F_x, F_y, F_z, \tau_x, \tau_y, \tau_z]^T; L_{all}\begin{bmatrix}F_{FL}\\F_{FR}\\F_{RL}\\F_{RR}\end{bmatrix} = F_B;$$

where $F_B$ represents the forces applied to the body, $F_{FL}$, $F_{FR}$, $F_{RL}$, and $F_{RR}$ represent the desired support forces applied to soles of the four legs when the robot is supported by the four legs, $F_{all}$ represents the mapping matrix, $F_x$, $F_y$, $F_z$ represent the three forces along the x-axis, the y-axis, and the z-axis, $\tau_x$, $\tau_y$, $\tau_z$ represent the three torques about the x-axis, the y-axis, and the z-axis.

4. The method according to claim 1, wherein determining the weight matrix for each of the priority targets, and creating the optimization model of the support forces for each of the priority targets based on the mapping matrix and the weight matrices comprises:
   according to a number of elements in each of the priority targets and a position of each of the elements in the forces applied to the body, selecting row vectors from the mapping matrix to create sub-mapping matrices of the priority targets;
   for an i-th priority target $F_i$, solving a corresponding one of the desired support forces $F_{Li}$ applied to soles of the plurality of legs using any of optimization models as follows: $F_{Li} = \mathrm{argmin}((K_i L_i F_{Li} - K_i F_i)^T (K_i L_i F_{Li} - K_i F_i))$; and $F_{Li} = \mathrm{pinv}(K_i L_i) K_i F_i$, where $K_i$ represents the weight matrix corresponding to the i-th priority target $F_i$, $L_i$ represents the sub-mapping matrix corresponding to the i-th priority target $F_i$, i is a natural number, and $1 \leq i \leq N$.

5. The method according to claim 1, wherein the one of the desired support forces corresponding to the current priority target serving as the basis for solving one of the support forces corresponding to the next priority target comprises:
   in a null space of the one of the desired support forces corresponding to the current priority target, solving the one of the support forces corresponding to the next priority target.

6. The method according to claim 5, wherein the plurality of priority targets comprises a high-priority first priority target $F_1$ and a low-priority second priority target $F_2$ when the robot walks on a horizontal surface, the first priority target $F_1$ and the second priority target $F_2$ are calculated according to formulas as follows: $F_1 = [F_z, \tau_x, \tau_y]^T$, $F_2 = [F_x, F_y, \tau_z]^T$, where $F_x$, $F_y$, and $F_z$ represent the three forces along the x-axis, the y-axis, and the z-axis, and $\tau_x$, $\tau_y$, $\tau_z$ represent the three torques about the x-axis, the y-axis, and the z-axis.

7. The method according to claim 6, wherein solving the optimization model of each of priority targets to obtain the desired support forces corresponding to each of the priority targets according to the order of priority from high to low, comprises:

optimally solving the optimization model of the first priority target to obtain the one of the support forces satisfying the first priority target, and solving the null space of the one of the support forces corresponding to the first priority target;

in the null space of the one of the support forces corresponding to the first priority target, optimally solving the optimization model of the second priority target, and using a solution that satisfies or is closest to the second priority target as the one of the support forces of the second priority target;

wherein the one of the support forces $F_{L2}$ of the second priority target $F_2$ is calculated according to formulas as follows:

$$\begin{cases} F_{L2} = N(L_1); N(L_1) = \{F_{L1} \mid L_1 F_{L1} = 0\}; \\ F_{L2} = \mathrm{argmin}((K_2 L_2 F_{L2} - K_2 F_2)^r (K_2 L_2 F_{L2} - K_2 F_2)) \end{cases}$$

$$\text{or } F_{L2} = p \ln v (K_2 L_2) K_2 F_2,$$

where $N(L_1)$ represents the null space of the one of the support forces $F_{L1}$ corresponding to the first priority target $F_1$, $L_1$ represents the sub-mapping matrix corresponding to the first priority target $F_1$, $K_2$ represents the weight matrix of the second priority target, and $L_2$ represents the sub-mapping matrix corresponding to the second priority target.

8. The method according to claim 1, wherein calculating the joint torques of the supporting legs for joint control, based on the solved desired support forces and Jacobian matrices corresponding to the supporting legs, comprises:

for each of the supporting legs, calculating the Jacobian matrix corresponding to the leg from a first joint of the leg to an end of the sole of the leg according to the joint angles of the leg, with the first joint of the leg being a base, wherein the first joint of the leg is one of a plurality of joints of the leg that is closest to the body;

for each of the supporting legs, obtaining the joint torques of the leg by multiplying a transpose of the Jacobian matrix of the leg and the one of the desired support forces corresponding to the leg; and sending the joint torques of the supporting legs to corresponding joint motors of the supporting legs for joint control.

9. A non-transitory computer-readable storage medium storing one or more programs to be executed in a multi-legged robot having a body and a plurality of legs, the one or more programs, when being executed by one or more processors of the multi-legged robot, causing the multi-legged robot to perform processing comprising:

obtaining a current pose of the body, forces applied to the body, and a plurality of joint angles of each of supporting legs of the legs, wherein the forces act in different directions;

creating a mapping matrix from the forces applied to the body to desired support forces applied to soles of the supporting legs based on the current pose of the body, the forces applied to the body, and the plurality of joint angles of each of the supporting legs;

obtaining a plurality of priority targets by prioritizing the forces acting in different directions, determining a weight matrix for each of the priority targets, and creating an optimization model of the support forces for each of the priority targets based on the mapping matrix and the weight matrices;

according to an order of priority from high to low, solving the optimization model of each of the priority targets to obtain the desired support forces corresponding to each of the priority targets, wherein one of the desired support forces corresponding to a current priority target serves as a basis for solving one of the support forces corresponding to a next priority target; and calculating joint torques of the supporting legs for joint control, based on the solved desired support forces and Jacobian matrices corresponding to the supporting legs.

10. The non-transitory computer-readable storage medium according to claim 9, wherein the forces applied to the body comprise three forces along an x-axis, a y-axis, and a z-axis and three torques about the x-axis, the y-axis, and the z-axis; creating the mapping matrix from the forces applied to the body to the desired support forces applied to soles of the supporting legs based on the current pose of the body, the forces applied to the body, and the plurality of joint angles of each of the supporting legs, comprises:

selecting a point on the body as an origin of a body coordinate system, and calculating a position vector from the origin of the body coordinate system to an end of the sole of each of the supporting legs using a forward kinematics algorithm according to the pose of the body and the joint angles of the supporting legs;

establishing a first equation based on the desired support forces applied to soles of the plurality of supporting legs, a force of gravity of the body, and the three forces;

establishing a second equation based on the desired support forces applied to soles of the supporting legs, the position vectors, and the three torques;

calculating the mapping matrix from the forces applied to the body to the desired support forces applied to soles of the supporting legs based on the first equation and the second equation.

11. The non-transitory computer-readable storage medium according to claim 10, wherein the plurality of legs is four in number and each of the plurality of legs comprises three joints, the mapping matrix satisfies formulas as follows:

$$F_B = [F_x, F_y, F_z, \tau_x, \tau_y, \tau_z]^T; L_{all} \begin{bmatrix} F_{FL} \\ F_{FR} \\ F_{RL} \\ F_{RR} \end{bmatrix} = F_B;$$

where $F_B$ represents the forces applied to the body, $F_{FL}$, $F_{FR}$, $F_{RL}$, and $F_{RR}$ represent the desired support forces applied to soles of the four legs when the robot is supported by the four legs, $F_{all}$ represents the mapping matrix, $F_x$, $F_y$, $F_z$ represent the three forces along the x-axis, the y-axis, and the z-axis, $\tau_x$, $\tau_y$, $\tau_z$ represent the three torques about the x-axis, the y-axis, and the z-axis.

12. The non-transitory computer-readable storage medium according to claim 9, wherein determining the weight matrix for each of the priority targets, and creating the optimization model of the support forces for each of the priority targets based on the mapping matrix and the weight matrices comprises:

according to a number of elements in each of the priority targets and a position of each of the elements in the forces applied to the body, selecting row vectors from the mapping matrix to create sub-mapping matrices of the priority targets;

for an i-th priority target $F_i$, solving a corresponding one of the desired support forces FU applied to soles of the plurality of legs using any of optimization models as follows: $F_{Li}=\operatorname{argmin}((K_iL_iF_{Li}-K_iF_i)^T(K_iL_iF_{Li}-K_iF_i))$; and $F_{Li}=\operatorname{pinv}(K_iL_i)K_iF_i$, where $K_i$ represents the weight matrix corresponding to the i-th priority target $F_i$, $L_i$ represents the sub-mapping matrix corresponding to the i-th priority target $F_i$, i is a natural number, and $1 \leq i \leq N$.

13. The non-transitory computer-readable storage medium according to claim 9, wherein the one of the desired support forces corresponding to the current priority target serving as the basis for solving one of the support forces corresponding to the next priority target comprises:

in a null space of the one of the desired support forces corresponding to the current priority target, solving the one of the support forces corresponding to the next priority target.

14. The non-transitory computer-readable storage medium according to claim 13, wherein the plurality of priority targets comprises a high-priority first priority target $F_1$ and a low-priority second priority target $F_2$ when the robot walks on a horizontal surface, the first priority target $F_1$ and the second priority target $F_2$ are calculated according to formulas as follows: $F_1=[F_z, \tau_x, \tau_y]^T$, $F_2=[F_x, F_y, \tau_z]^T$, where $F_x$, $F_y$, and $F_z$ represent the three forces along the x-axis, the y-axis, and the z-axis, and $\tau_x$, $\tau_y$, $\tau_z$ represent the three torques about the x-axis, the y-axis, and the z-axis.

15. A multi-legged robot comprising:
one or more processors;
a memory; and
one or more programs, wherein the one or more programs are stored in the memory and configured to be executed by the one or more processors, the one or more programs comprises:
instructions for obtaining a current pose of the body, forces applied to the body, and a plurality of joint angles of each of supporting legs of the legs, wherein the forces act in different directions;
instructions for creating a mapping matrix from the forces applied to the body to desired support forces applied to soles of the supporting legs based on the current pose of the body, the forces applied to the body, and the plurality of joint angles of each of the supporting legs;
instructions for obtaining a plurality of priority targets by prioritizing the forces acting in different directions, determining a weight matrix for each of the priority targets, and creating an optimization model of the support forces for each of the priority targets based on the mapping matrix and the weight matrices;
instructions for according to an order of priority from high to low, solving the optimization model of each of the priority targets to obtain the desired support forces corresponding to each of the priority targets, wherein one of the desired support forces corresponding to a current priority target serves as a basis for solving one of the support forces corresponding to a next priority target; and
instructions for calculating joint torques of the supporting legs for joint control, based on the solved desired support forces and Jacobian matrices corresponding to the supporting legs.

16. The multi-legged robot according to claim 15, wherein the forces applied to the body comprise three forces along an x-axis, a y-axis, and a z-axis and three torques about the x-axis, the y-axis, and the z-axis; the instructions for creating the mapping matrix from the forces applied to the body to the desired support forces applied to soles of the supporting legs based on the current pose of the body, the forces applied to the body, and the plurality of joint angles of each of the supporting legs, comprise:

instructions for selecting a point on the body as an origin of a body coordinate system, and calculating a position vector from the origin of the body coordinate system to an end of the sole of each of the supporting legs using a forward kinematics algorithm according to the pose of the body and the joint angles of the supporting legs;

instructions for establishing a first equation based on the desired support forces applied to soles of the supporting legs, a force of gravity of the body, and the three forces;

instructions for establishing a second equation based on the desired support forces applied to soles of the supporting legs, the position vectors, and the three torques;

instructions for calculating the mapping matrix from the forces applied to the body to the desired support forces applied to soles of the supporting legs based on the first equation and the second equation.

17. The multi-legged robot according to claim 15, wherein the plurality of legs is four in number and each of the plurality of legs comprises three joints, the mapping matrix satisfies formulas as follows:

$$F_B = [F_x, F_y, F_z, \tau_x, \tau_y, \tau_z]^T; L_{all}\begin{bmatrix} F_{FL} \\ F_{FR} \\ F_{RL} \\ F_{RR} \end{bmatrix} = F_B;$$

where $F_B$ represents the forces applied to the body, $F_{FL}$, $F_{FR}$, $F_{RL}$, and $F_{RR}$ represent the desired support forces applied to soles of the four legs when the robot is supported by the four legs, $F_{all}$ represents the mapping matrix, $F_x$, $F_y$, $F_z$ represent the three forces along the x-axis, the y-axis, and the z-axis, $\tau_x$, $\tau_y$, $\tau_z$ represent the three torques about the x-axis, the y-axis, and the z-axis.

18. The multi-legged robot according to claim 15, wherein the instructions for determining the weight matrix for each of the priority targets, and creating the optimization model of the support forces for each of the priority targets based on the mapping matrix and the weight matrices comprise:

instructions for selecting row vectors from the mapping matrix to create sub-mapping matrices of the priority targets according to a number of elements in each of the priority targets and a position of each of the elements in the forces applied to the body;

instructions for, for an i-th priority target $F_i$, solving a corresponding one of the desired support forces $F_{Li}$ applied to soles of the supporting legs using any of optimization models as follows: $F_{Li}=\operatorname{argmin}((K_iL_iF_{Li}-K_iF_i)^T(K_iL_iF_{Li}-K_iF_i))$; and $F_{Li}=\operatorname{pinv}(K_iL_i)K_iF_i$, where $K_i$ represents the weight matrix corresponding to the i-th priority target $F_i$, $L_i$ represents the sub-mapping matrix corresponding to the i-th priority target $F_i$, i is a natural number, and $1 \leq i \leq N$.

19. The multi-legged robot according to claim 15, wherein the one of the desired support forces corresponding to the current priority target serving as the basis for solving one of the support forces corresponding to the next priority target comprises:

instructions for, in a null space of the one of the desired support forces corresponding to the current priority target, solving the one of the support forces corresponding to the next priority target.

20. The multi-legged robot according to claim 19, wherein the plurality of priority targets comprises a high-priority first priority target $F_1$ and a low-priority second priority target $F_2$ when the robot walks on a horizontal surface, the first priority target $F_1$ and the second priority target $F_2$ are calculated according to formulas as follows: $F_1=[F_z, \tau_x, \tau_y]^T$, $F_2=[F_x, F_y, \tau_z]^T$, where $F_x$, $F_y$, and $F_z$ represent the three forces along the x-axis, the y-axis, and the z-axis, and $\tau_x, \tau_y, \tau_z$ represent the three torques about the x-axis, the y-axis, and the z-axis.

* * * * *